US009273769B2

(12) United States Patent
Mizuno et al.

(10) Patent No.: US 9,273,769 B2
(45) Date of Patent: Mar. 1, 2016

(54) AUTOMATIC TRANSMISSION DEVICE FOR AUTOMOBILE

(71) Applicant: TOYOTA JIDOSHA KABUSHIKI KAISHA, Toyota-shi (JP)

(72) Inventors: Yoshihiro Mizuno, Toyota (JP); Koichi Tanaka, Okazaki (JP); Yusuke Ogata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/315,114

(22) Filed: Jun. 25, 2014

(65) Prior Publication Data

US 2014/0305114 A1   Oct. 16, 2014

Related U.S. Application Data

(62) Division of application No. 13/057,422, filed as application No. PCT/JP2009/058332 on Apr. 28, 2009, now Pat. No. 9,003,926.

(51) Int. Cl.
| F16H 41/02 | (2006.01) |
| F16H 41/30 | (2006.01) |
| F16H 7/06  | (2006.01) |
| F16H 45/02 | (2006.01) |
| F16H 57/04 | (2010.01) |

(52) U.S. Cl.
CPC ............... *F16H 41/02* (2013.01); *F16H 41/30* (2013.01); *F16H 7/06* (2013.01); *F16H 45/02* (2013.01); *F16H 57/0441* (2013.01); *Y10T 74/19149* (2015.01); *Y10T 74/19153* (2015.01)

(58) Field of Classification Search
CPC ...... F16H 41/30; F16H 41/02; F16H 57/0441
See application file for complete search history.

(56) References Cited

U.S. PATENT DOCUMENTS

| 4,841,729 | A | * | 6/1989 | Mori .............................. 60/361 |
| 5,129,285 | A | * | 7/1992 | Sugano et al. ............... 74/730.1 |
| 6,491,586 | B1 |   | 12/2002 | Nakamura et al. |

(Continued)

FOREIGN PATENT DOCUMENTS

| JP | 6 76752   | 10/1994 |
| JP | 2003156130 | 5/2003  |

(Continued)

OTHER PUBLICATIONS

International Search Report issued Jul. 28, 2009 in PCT/JP09/58332 filed Apr. 28, 2009.

*Primary Examiner* — Terence Boes
(74) *Attorney, Agent, or Firm* — Oblon, McClelland, Maier & Neustadt, L.L.P.

(57) ABSTRACT

An automatic transmission device for an automobile includes a torque converter accommodated in a torque converter housing, a stator shaft supporting a stator of the torque converter, a torque converter housing, a stator shaft supporting a stator of the torque converter, a torque converter sleeve provided concentrically with the stator shaft and coupled with an inner periphery side of an impeller shell of the torque converter, a first bearing provided between an inner peripheral surface of the torque converter sleeve and an outer peripheral surface of the stator shaft, and a second bearing provided between an outer peripheral surface of the torque converter sleeve and an inner surface of the torque converter housing.

5 Claims, 6 Drawing Sheets

(56) References Cited

U.S. PATENT DOCUMENTS

| | | |
|---|---|---|
| 6,810,772 B2 | 11/2004 | Hori et al. |
| 7,412,913 B2 | 8/2008 | Ishikawa et al. |
| 2002/0006237 A1 | 1/2002 | Nakamura et al. |
| 2005/0255954 A1 | 11/2005 | Ishikawa et al. |
| 2006/0054412 A1 | 3/2006 | Takahashi et al. |
| 2006/0272609 A1* | 12/2006 | Mizuno et al. ............ 123/196 R |
| 2008/0293530 A1 | 11/2008 | Makita |
| 2011/0132141 A1 | 6/2011 | Mizuno et al. |

FOREIGN PATENT DOCUMENTS

| | | |
|---|---|---|
| JP | 2005 299830 | 10/2005 |
| JP | 2005 325979 | 11/2005 |
| JP | 2006064009 | 3/2006 |
| JP | 200690367 | 4/2006 |
| JP | 2007107611 | 4/2007 |
| JP | 200974615 | 4/2009 |

* cited by examiner

AUTOMATIC TRANSMISSION DEVICE FOR AUTOMOBILE

CROSS REFERENCE TO RELATED APPLICATIONS

This application is a divisional of U.S. application Ser. No. 13/057,422, filed on Feb. 3, 2011, and is based upon and claims the benefit of priority to International Application No. PCT/JP2009/058332, filed on Apr. 28, 2009. The entire contents of each of documents are incorporated herein by reference.

TECHNICAL FIELD

The present invention relates to oil passage structures of a chain-driven oil pump applied to automatic transmission devices for automobiles.

BACKGROUND ART

Generally, automatic transmission devices for automobiles, which include automatic transmissions and stepless transmissions for vehicles, include, as components that constitutes a gear shift mechanism or other components, torque transmission mechanisms such as various types of rotational axis and gears, and are configured such that the gear ratio is changed depending on the path through which the torque is transmitted through some of such torque transmission mechanisms. An oil pump is provided for generating hydraulic pressure for driving these mechanisms to change the gearshift ratio or for the purpose of lubrication.

The mechanism proposed in Patent Literature 1 can be given as a typical example of the mechanism for driving an oil pump that is applied to an automatic transmission device in which an oil pump as described above is arranged on an axis different from an input shaft.

In the oil pump drive mechanism disclosed in Patent Literature 1, a drive sprocket provided in the outer peripheral portion of a torque converter sleeve and a driven sprocket provided in the oil pump are linked with a chain, thereby driving the oil pump with the drive force of the engine. Since a torque converter cover expands due to an increase in the oil temperature or hydraulic pressure in the torque converter, the torque converter sleeve is required to be movable to some extent in the axis direction. Therefore, the outer periphery surface of the torque converter sleeve and the inner periphery surface of the drive sprocket are fitted to each other so as to be respectively movable in the axis direction, the drive sprocket is axially supported, and the drive force is transmitted while allowing the movement thereof in the axial direction.

Also in Patent Literature 2, an oil pump drive mechanism that can improve durability and prevent noise is proposed.

With the technique disclosed in Patent Literature 2, in an oil pump drive mechanism in which an oil pump is arranged in a position separated from the rotational axis of the torque converter in the radial direction thereof, and a first sprocket that rotates about the rotational axis and a second sprocket that drives the oil pump are linked with a chain, a first cylinder portion is formed that is on the outer periphery of the rotational axis of the torque converter, is driven integrally with the input side of the torque converter, and is fitted into the first sprocket, and a second cylinder portion as a fixed member is formed on the inner periphery of the first cylinder portion, and a first bearing that supports the first cylinder portion to the second cylinder portion and a second bearing that supports the first sprocket to the second cylinder portion are provided.

Furthermore in Patent Literature 3, an oil pump drive mechanism for an automatic transmission is proposed that can reduce friction caused by the rotation of the sprocket, while restraining attachment backlash of the sprocket.

In the technique disclosed in Patent Literature 3, in the oil pump drive mechanism of automatic transmission that drives an oil pump arranged in a position separated from the rotation center axis of the torque converter in the radial direction thereof, the first sprocket is supported to the torque converter housing so as to be freely rotatable, by a first bearing loaded in the radial direction and a second bearing loaded in the thrust direction, a sealing is provided for achieving liquid-tightness between the first sprocket and the cover, and thrust force toward the second bearing is applied to the first sprocket with the use of the hydraulic pressure supplied to the oil chamber formed between the first sprocket and the cover.

CITATION LIST

Patent Literature

[PTL 1]
JP 2003-156130A
[PTL 2]
JP 2005-325979A
[PTL 3]
JP 2006-64009A

SUMMARY OF INVENTION

Technical Problem

Incidentally, in the technique disclosed in Patent Literature 2 and 3, there are only two lines of oil passage for supplying oil from a center support to the torque converter, a first oil passage for supplying oil to the torque converter through the inside of the input shaft, and a second oil passage for supplying oil to the torque converter through the space defined by the outer periphery surface of the input shaft and the inner periphery surface of the stator shaft. Accordingly, so-called flex lock-up cannot be utilized to a maximum extent.

Moreover, in the technique disclosed in Patent Literature 2 and 3, the stated first and second oil passages are provided on the inner diameter side of the drive sprocket. For this reason, the diameters of the drive sprocket and the driven sprocket are increased, which is disadvantageous in terms of mounting, weight and cost of the automatic transmission device. In addition, since the diameters of the seal ring and the bearing provided in the sprocket are increased, torque loss is large.

The present invention has been achieved in view of such conditions, and aims at providing an oil passage structure of the chain-driven oil pump that enables using the flex lock-up to a maximum extent and reducing the diameter of the sprocket.

Solution to Problem

In order to achieve the above aim, an oil passage structure of a chain-driven oil pump of the present invention is applicable to an automatic transmission device for an automobile in which a torque converter is accommodated in a torque converter housing, and a stator is attached to a stator shaft via a one-way clutch, includes a chain system that, on the torque converter side of a center support, transmits via a chain drive force that has been transmitted to a drive sprocket to a driven sprocket placed in a position separated from the rotational center of the drive sprocket in a radial direction thereof, an oil pump being driven via the chain system, and an oil passage for supplying oil to the torque converter by bypassing the drive sprocket. In the structure, the oil passage is provided in a position on the outer periphery side of the drive sprocket where the oil passage does not interfere with the operation of the chain.

With the above configuration, since an oil passage for supplying oil to the torque converter by bypassing the drive sprocket is provided, it is possible to use the flex lock-up to a maximum extent. This is because while the heat amount generated in the torque converter increases at the time of the flex lock-up, since fuel-cut control and slip control are carried out in combination, the above oil passage serves as a lubrication oil passage for suppressing heat generation in the torque converter.

The above-described oil passage structure of the chain-driven oil pump further includes thrust force application means for applying a thrust force toward the drive sprocket with the use of hydraulic pressure supplied from the oil passage.

With the above configuration, a thrust force toward the drive sprocket is applied due to the hydraulic pressure supplied through the oil passage for supplying oil to the torque converter by bypassing the drive sprocket. Therefore, a seal ring on the inner diameter side of the drive sprocket can be eliminated, thereby reducing torque loss and enabling positioning of the drive sprocket.

Also, the above-described oil passage structure of the chain-driven oil pump may include, in addition to the oil passage, an oil passage for supplying oil to the torque converter through the inside of an input shaft of the torque converter and an oil passage for supplying oil to the torque converter through a space defined by the outer periphery surface of the input shaft and the inner periphery surface of the stator shaft, thereby providing three lines of oil passages as oil passages for supplying oil from the center support to the torque converter.

As described above, even if three lines of oil passages for supplying oil from the center support to the torque converter are provided, namely, an oil passage for supplying oil to the torque converter through the inside of the input shaft of the torque converter, an oil passage for supplying oil to the torque converter through the space defined by the outer periphery surface of the input shaft and the inner periphery surface of the stator shaft, and an oil passage for supplying oil to the torque converter by bypassing the drive sprocket, the oil passage for supplying oil to the torque converter by bypassing the drive sprocket is provided in a position on the outer periphery side of the drive sprocket where the passage does not interfere with the operation of the chain as described above, so the increase in the size of the drive sprocket and the driven sprocket can be avoided.

With the configuration of the present invention, it is possible to cope with the case in which two lines of oil passages for supplying oil from the central support to the torque converter are provided. In such a case, the oil passage for supplying oil to the torque converter by bypassing the drive sprocket can be used in place of the passage for supplying oil to the torque converter through the inside of the input shaft of the torque converter or the oil passage for supplying oil to the torque converter through the space defined by the outer periphery surface of the input shaft and the inner periphery surface of the stator shaft. In this manner, the passage for supplying oil to the torque converter through the inside of the input shaft of the torque converter or the oil passage for supplying oil to the torque converter through the space defined by the outer periphery surface of the input shaft and the inner periphery surface of the stator shaft can be eliminated, thereby enabling size reduction.

Advantageous Effects of Invention

According to the present invention, it is possible to utilize the flex lock-up to a maximum extent and also to reduce the diameter of the sprocket.

DESCRIPTION OF EMBODIMENTS

The embodiments of the present invention will be described in detail below, with reference to attached drawings.

First Embodiment

Configuration

Figure 1:
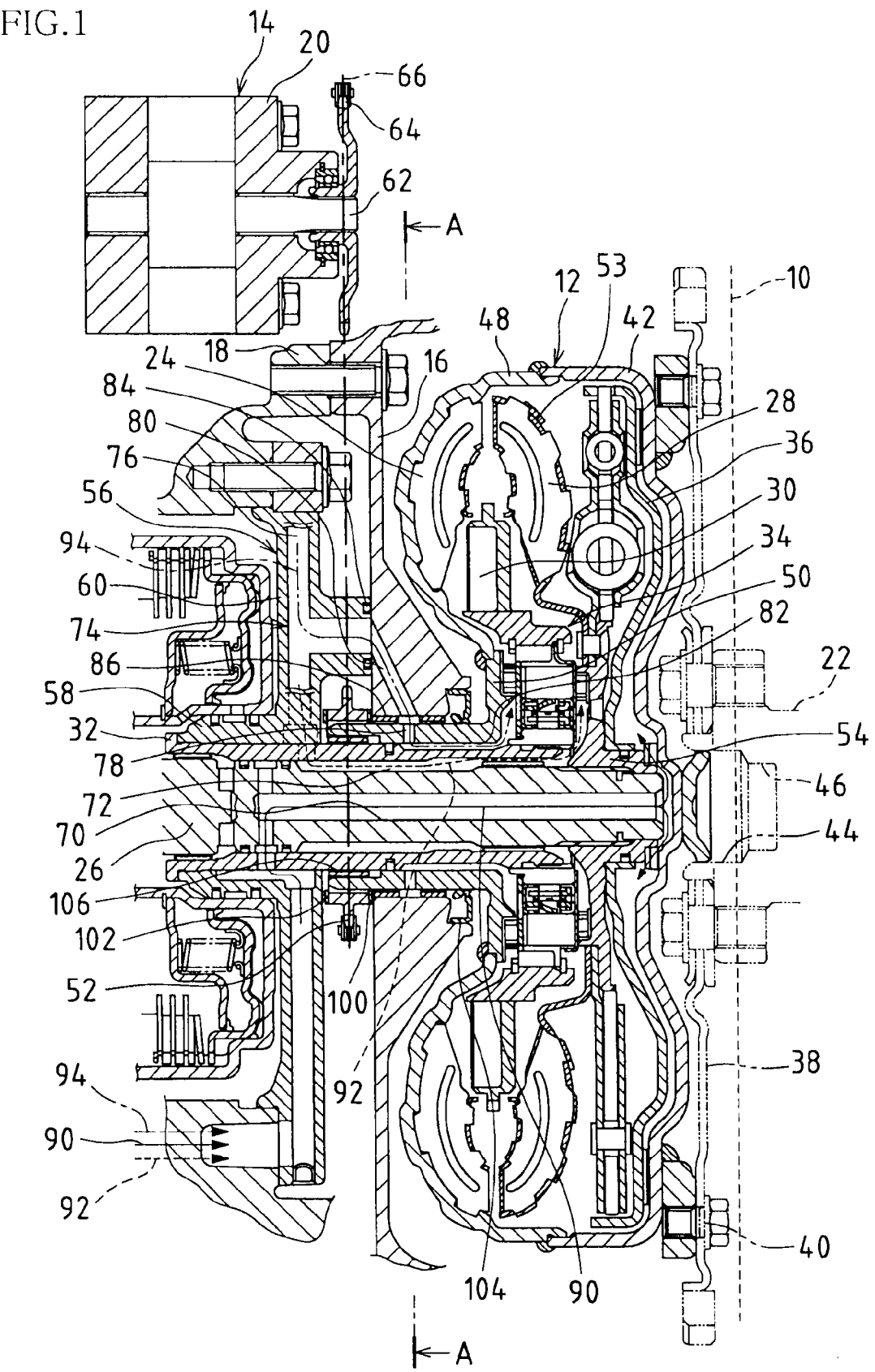
FIG. 1 is a partial cross-sectional view illustrating a torque converter of an automatic transmission device for automobile to which an oil passage structure according to a first embodiment of the present invention is applied, and an area in the proximity of an oil pump drive mechanism.
Figure 2:
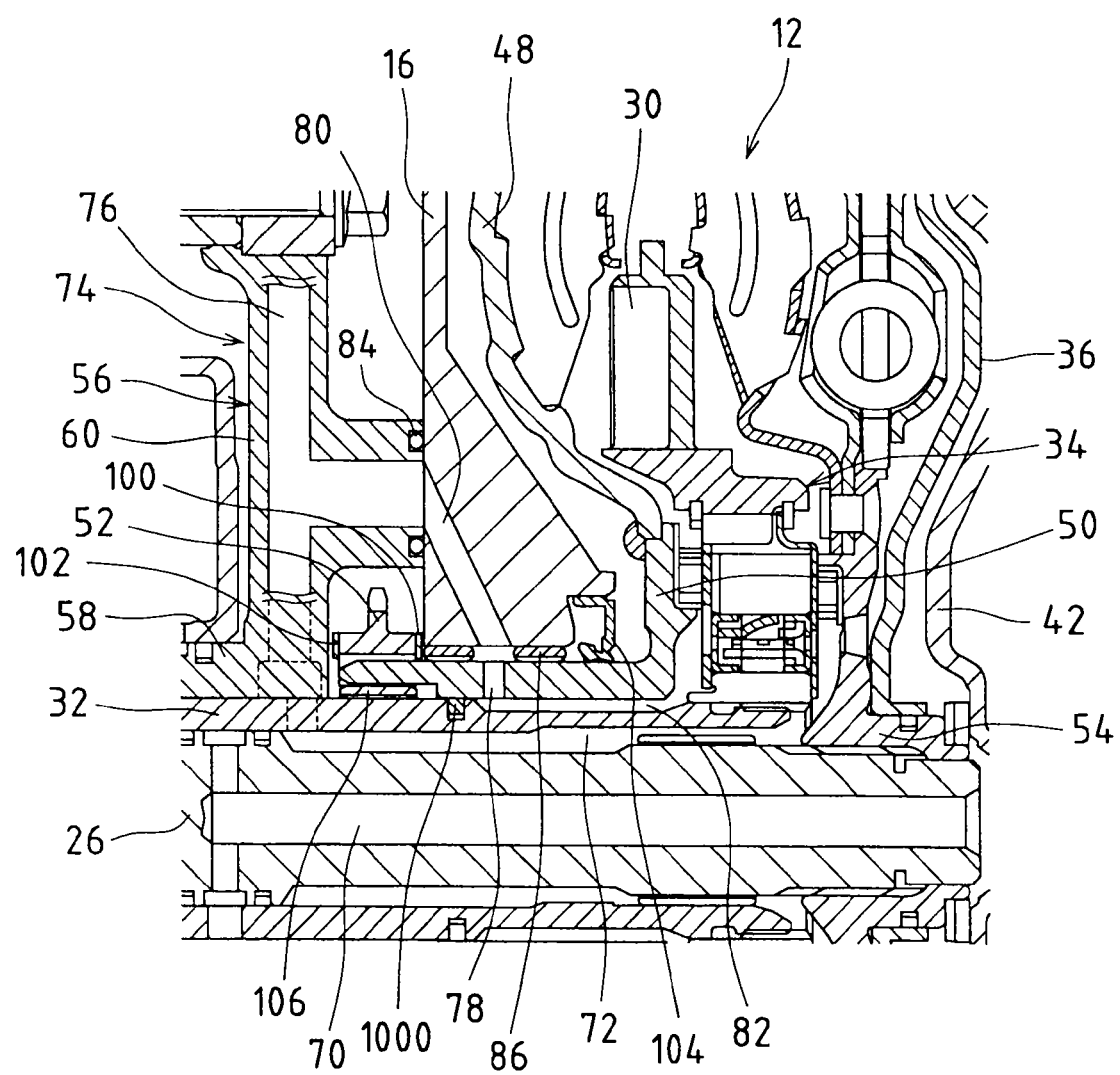
FIG. 2 is an enlarged view of main portions of FIG. 1.
Figure 3:
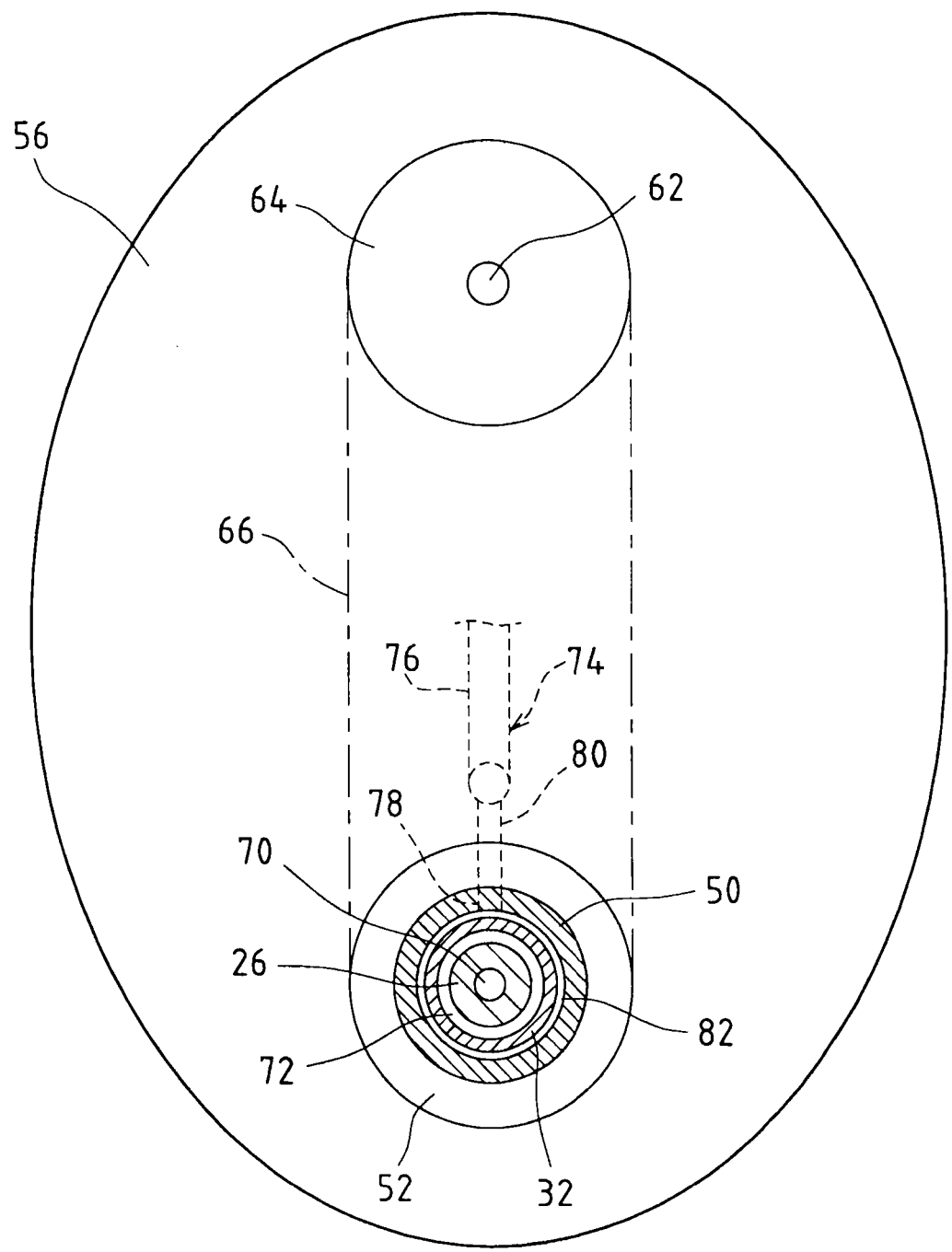
FIG. 3 is a diagram showing the state viewed from the direction of arrow A in FIG. 1 in a simplified manner.

FIG. 1 is a partial cross-sectional view illustrating a torque converter of an automatic transmission device for an automobile to which an oil passage structure according to the first embodiment of the present invention is applied, and the area in the proximity of an oil pump drive mechanism. FIG. 2 is an enlarged view of main portions of FIG. 1. FIG. 3 is a diagram showing the state viewed from the direction of arrow A in FIG. 1 in a simplified manner.

First, description is given with reference to FIG. 1. In FIG. 1, reference numeral 10 is an engine, and this engine 10 is connected to a torque converter 12 and a gear shift mechanism (not shown). Note that there is no limitation to the gear shift mechanism, and a belt-type stepless gear shift mechanism or stepped automatic gear shift mechanism, for example, may be used as appropriate.

Reference numeral 14 is an oil pump. This oil pump 14 is provided in a position displaced to the opposite side from the engine 10 with respect to the torque converter 12, and separated outwardly from the rotation center axis of the torque converter 12 in the radial direction thereof.

As a form of connecting these components, a torque converter housing 16 is attached to the output side of the engine 10. A transmission case 18 is attached to the output side of the torque converter housing 16. The torque converter 12 is accommodated in the torque converter housing 16. In the transmission case 18, the oil pump 14, planetary gears, clutch, brake and the like (not shown) are accommodated.

The torque converter 12 includes a pump impeller 24 that is driven by a crankshaft 22 of the engine 10, a turbine runner 28 that is linked to an input shaft 26 of the gear shift mechanism in a state in which it opposes the pump impeller 24, a stator 30 provided between the pump impeller 24 and the turbine runner 28, a one-way clutch 34 provided between the stator 30 and a stator shaft 32. A lock-up clutch piston 36 with dumper is placed between the turbine runner 28 and an engine drive plate 38.

More specifically, the engine drive plate 38 is connected with bolts to the crankshaft 22 that outputs the drive force of the engine 10. A link portion 40 is provided on the outer side in the radial direction of the engine drive plate 38, and is connected to a cover 42 (hereinafter referred to as a "torque converter cover") of the torque converter 12.

A pilot boss 44 is provided in a central axis portion on the engine 10 side of the torque converter cover 42, and the torque converter 12 is centered and axially supported with a bearing hole 46 that is provided in the shaft center of the crankshaft 22. To the end portion of the torque converter cover 42 on the opposite side to the engine 10, an impeller shell 48 is connected by welding. A sleeve 50 of the torque converter 12 (hereinafter referred to as a "torque converter sleeve") is connected by welding to the inner periphery side of the impeller shell 48, and extends towards the gear shift mechanism.

A drive sprocket 52 is fitted to the outer periphery of the torque converter sleeve 50. This drive sprocket 52 supports a bearing 106 so as to define the space to which the fitting portion of the torque converter sleeve 23 is fitted in.

The pump impeller 24 is provided inside of the impeller shell 48. The turbine runner 28 is placed on the engine 10 side of the impeller shell 48 that is opposite from the pump impeller 24, with the exterior thereof being covered with a turbine shell 53.

The inner peripheral portion of the turbine shell 53 is linked to the input shaft 26 via a hub 54. The inner race of the one-way clutch 34 that supports the stator 30 is spline-fitted to the stator shaft 32, and needle bearings are provided respectively on the side of the one-way clutch 34, between the torque converter sleeve 50 and the one-way clutch 34, and between a hub 54 of a turbine shell 20 and the one-way clutch 34.

A center support 56 is attached inside the transmission case 18 on the side where the transmission case 18 is joined to the torque converter housing 16.

The center support 56 includes the stator shaft 32 inside of which the input shaft 26 penetrates with a gap in the radial direction and that supports the stator 30 on the outer peripheral portion extending to the engine 10 side via the one-way clutch 34, a cylinder portion 58 that is formed integrally with the stator shaft 32 and transfers/receives oil to/from a clutch (not shown), and a flange portion 60 that extends outwardly in the radial direction from the cylinder portion 58 and is provided inside with a plurality of oil passages for sending oil from valves or the like.

The oil pump 14 is placed in a position that is separated outwardly in the radial direction from the input shaft 26. The oil pump 14 is driven by an oil pump drive shaft 62.

The oil pump drive shaft 62 protrudes toward the engine 10 from the oil pump 14, and a driven sprocket 64 is fitted to the projection portion. This projection portion is supported by an oil pump housing 20 via a bearing.

A chain 66 is wound around the drive sprocket 52 and the driven sprocket 64 so that power transmission is possible. In other words, in the present embodiment, a chain system is constituted by the drive sprocket 52, the driven sprocket 64 and the chain 66. On the side of the torque converter 12 of the center support 56, a drive force transmitted to the drive sprocket 52 is transmitted to the driven sprocket 64 placed in a position separated in the radial direction from the rotational center of the drive sprocket 52 via the chain 66.

Note that the intake opening of the oil pump 14 can intake oil through an oil strainer from the inside of an oil pan provided below the transmission case 18. Also, a valve body that contains a control valve and the like is placed in the vicinity of the oil pump 14, so that it is possible to transfer/receive oil to/from a discharge opening of the oil pump 14 or an oil passage of the center support 56 other than the above-described oil passages.

Here, characteristic portions of the present embodiment are described with reference to FIG. 2.

The present embodiment includes three lines of oil passages for supplying oil (ATF: automatic transmission fluid) from the center support 56 to the torque converter 12, namely, first, second and third oil passages 70, 72 and 74.

The first oil passage 70 is for supplying oil to the torque converter 12 through the inside of the input shaft 26 of the torque converter 12, and is formed in the input shaft 26 along the axis direction.

The second oil passage 72 is for supplying oil to the torque converter 12 through the space defined by the outer periphery surface of the input shaft 26 and the inner periphery surface of the stator shaft 32, and is given by the space defined by the outer periphery surface of the input shaft 26 and the inner periphery surface of the stator shaft 32.

The third oil passage 74 is for supplying oil to the torque converter by bypassing the drive sprocket 52, and is constituted by a lead-in flow channel 76 that extends in the perpendicular direction with respect to the fitting portion of the torque converter sleeve 50 and the drive sprocket 52 in the flange portion 60 of the center support 56, a lead-out flow channel 78 formed in the torque converter sleeve 50 along the radial direction, and a communication flow channel 80 formed in the torque converter housing 16 so that the lead-in flow channel 76 communicates with the lead-out flow channel 78. The oil led out from the third oil passage 74, that is, the lead-out flow channel 78, is supplied to the torque converter 12 via an oil chamber 82 that is formed between the stator shaft 32 and the torque converter sleeve 50. Note that the oil chamber 82 extends in the axis direction toward the torque converter 12.

In this manner, since the third oil passage 74 is constituted by the above-described lead-in flow channel 76, lead-out flow channel 78 and communication flow channel 80, in the present embodiment, a seal groove is formed in a face of the center support 56 that opposes the torque converter housing 16, and the seal groove is provided with an oil seal gasket 84. By the oil seal gasket 84 contacting the surface of the torque converter housing 16 that opposes the center support 56, liquid-tightness is kept between the torque converter housing 16 and the center support 56. On the other hand, a bearing 86 having an opening and groove formed thereon is interposed between the torque converter housing 16 and the torque converter sleeve 50, and the positions of the communication flow channel 80 and the lead-out flow channel 78 are aligned with the use of the bearing 86. In other words, the bearing 86 forms a part of the third oil passage 74.

The third oil passage 74 is provided on the outer periphery side of the drive sprocket 52 and inside the operation range of the chain 66, as shown in FIG. 3.

Operation

When the engine 10 is started, the crankshaft 22 rotatively drives the torque converter cover 42, impeller shell 48 and torque converter sleeve 50 via the engine drive plate 38. By the pump impeller 24 provided on the inner periphery side of the impeller shell 48 supplying oil to the turbine runner 28, the drive torque from the engine 10 is transmitted to the input shaft 26 of the gear shift mechanism. At this time, in accordance with the operation of the stator 30 and the lock-up clutch piston 36, the amount of torque transmitted from the pump impeller 24 to the turbine runner 28 is increased, or is kept the same.

While the above-described engine 10 operates, the drive sprocket 52 fitted to the torque converter sleeve 50 that integrally rotates with the engine 10 is rotatively driven along with the torque converter sleeve 50. The rotation of the drive sprocket 52 is transmitted to the driven sprocket 64 via the chain 66, and the oil pump drive shaft 62 provided as a single body with the driven sprocket 64 drives the oil pump 14, thereby generating hydraulic pressure. The hydraulic pressure thus generated is supplied to the valve in the valve body, and then is supplied to the torque converter 12, clutch, brake and the like from the valve.

Pressure oil is supplied from the center support 56 to the torque converter 12 separately through three lines of the first, second and third oil passages 70, 72 and 74.

The first line is shown with an arrow 90 in FIG. 1, and supplies oil to the torque converter 12 through the first oil passage 70 formed inside the input shaft 26 and along the axis direction.

The second line is shown with an arrow 92 in FIG. 1, and supplies oil to the torque converter 12 through the second oil passage 72 given by the space defined by the outer periphery surface of the input shaft 26 and the inner periphery surface of the stator shaft 32.

The third line is shown with an arrow 94 in FIG. 1, and supplies oil to the torque converter 12 through the third oil passage 74 by bypassing the drive sprocket 52. Specifically, oil is introduced into the lead-in flow channel 76 that extends perpendicularly to the torque converter sleeve 50 in the flange portion 60 of the center support 56. Then, oil is led from the lead-in flow channel 76 into the lead-out flow channel 78 via the communication flow channel 80 formed in the torque converter housing 16. Thereafter, oil is led out from the lead-out flow channel 78 to the oil chamber 82 formed between the stator shaft 32 and the torque converter sleeve 50, and is then supplied from the oil chamber 82 to the torque converter 12.

Actions/Effects

The present embodiment achieves the following actions and effects.

(1) Since the present embodiment has three lines of oil passages for supplying oil from the center support 56 to the torque converter 12; the first oil passage 70 for supplying oil to the torque converter 12 through the inside of the input shaft 26, the second oil passage 72 for supplying oil to the torque converter through the space defined by the outer periphery surface of the input shaft 26 and the inner periphery surface of the stator shaft 32, and the third oil passage 74 for supplying oil to the torque converter 12 by bypassing the drive sprocket 52, it is possible to utilize the flex lock-up to a maximum extent. This is because while the heat amount generated in the torque converter 12 increases at the time of the flex lock-up since fuel-cut control and slip control are carried out in combination, the third oil passage 74 serves as a lubrication oil passage for suppressing heat generation in the torque converter 12.

(2) Conventionally, a thrust needle bearing is interposed between the flange portion of the drive sprocket 52 on the torque converter 12 side and the side wall face of the inner peripheral portion of the torque converter housing 16, the thrust needle bearing being loaded in the thrust direction due to hydraulic pressure, and the drive sprocket 52 is supported by the torque converter housing 16 in the thrust direction so as to be freely rotatable. However, in the present embodiment, the drive sprocket 52 is not affected by the thrust force, and therefore as shown in FIGS. 1 and 2, inexpensive washers 100 and 102 can be used instead of the thrust needle bearing.

(3) While conventionally, a lock-up oil passage is used for lubrication of the bearing 86 and an oil seal 104, in the present embodiment, the third oil passage 74 is used as the lubrication oil passage as described above. Therefore, it is not necessary to use the first and second oil passages 70 and 72 as the lubrication oil passage, so there is no possibility for the pressure of the torque converter oil passage becoming low.

(4) As described above, since the third oil passage 74 is not provided in the drive sprocket 52, but is configured to supply oil to the torque converter 12 by bypassing the drive sprocket 52, a sealing 1000 can be attached to the stator shaft 32 as shown in FIGS. 1 and 2, and accordingly a reduction in the diameter of the sealing 1000 can be realized. As a result, torque loss can be reduced. Also an O-ring is conventionally provided on the inner diameter side of the drive sprocket 52, and thus it is highly likely that the O-ring on the inner diameter side of the drive sprocket 52 is damaged when assembling the torque converter 12, and consequently discontinuities in the O-ring have been sometimes overlooked, or many steps have been required for adjustment. However, the O-ring on the inner diameter side of the drive sprocket 52 can be eliminated, so such problems can be solved.

(5) The present embodiment has three lines of oil passages for supplying oil from the center support 56 to the torque converter, namely, the first, second and third oil passages 70, 72 and 74. Among these passages, the third oil passage 74 is provided inside the operation range of the chain 66 and on the outer periphery side of the drive sprocket 52, and so even if three lines oil passages for supplying oil from the center support 56 to the torque converter 12 are provided, an increase in the size of the drive sprocket 52 and the driven sprocket 64 can be avoided. Also, center alignment of the sprockets 52 and 64 is possible when assembling the sprockets 52 and 64, and it is possible to confirm visually if the chain 66 is wound around the sprockets 52 and 64.

(6) The bearing 86 having an opening and groove formed thereon is interposed between the torque converter housing 16 and the torque converter sleeve 50, and the bearing 86 forms part of the third oil passage 74. Therefore, in addition to the lubrication for the bearing 86 itself, the lubrication for the washers 100 and 102 as well as the oil seal 104 can be achieved due to oil leaked from the third oil passage 74, to the space between the bearing 86 and the torque converter 12.

(7) Conventionally, since the sprockets 52 and 64 subject to the tension from the chain 66 are supported by the bearings in a cantilever fashion, the central axes thereof become misaligned, or since the bearings are fixed to the torque converter housing 16, partial abrasion occurs. In the present embodiment, however, the sprockets 52 and 64 are supported by the center support 56, and the bearing 106 (see FIGS. 1 and 2) is fixed to the drive sprocket 52, so there is no possibility of occurrence of central axes misalignment or uneven abrasion.

(8) Conventionally, the central axes become misaligned since the torque converter 12 is supported by the torque converter housing 16 via the drive sprocket 52. In the present embodiment, however, since the torque converter 12 is supported by the torque converter housing 16, the accuracy in alignment of the central axes is improved.

(9) Since no seal ring is provided on the side of the center support 56 of the drive sprocket 52, the total length can be reduced.

Second Embodiment

Figure 4:
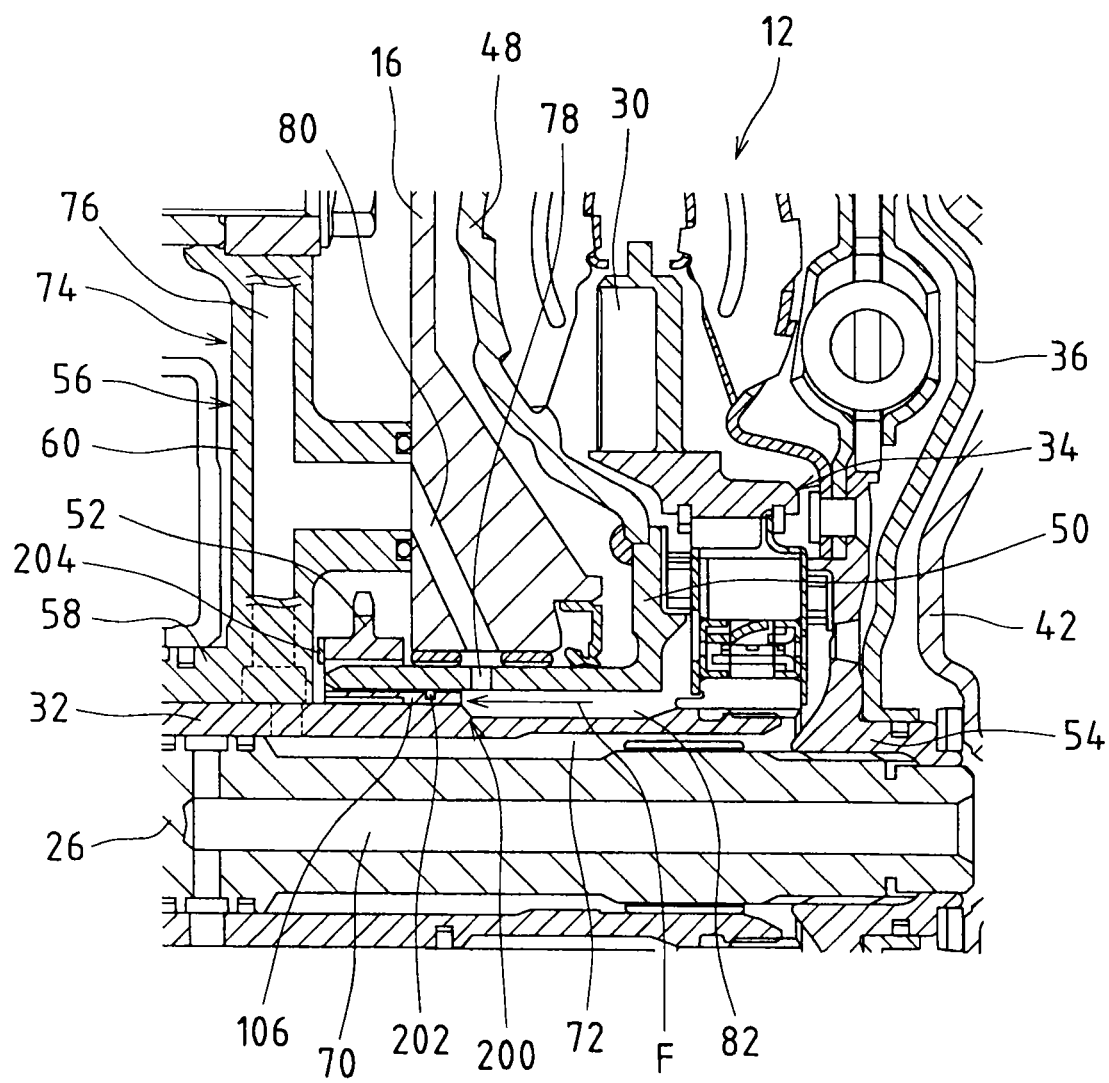
FIG. 4 is a cross-sectional and enlarged view of a torque converter of an automatic transmission device for automobile to which an oil passage structure according to a second embodiment of the present invention is applied, and main portions in the proximity of an oil pump drive mechanism.

FIG. 4 is a cross-sectional and enlarged view of a torque converter of an automatic transmission to which an oil passage structure according to the second embodiment of the present invention is applied, and main portions in the proximity of an oil pump drive mechanism.

As seen in FIG. 4, the present embodiment is characterized in that a thrust force application mechanism 200 for applying thrust force F toward the drive sprocket 52 with the use of the hydraulic pressure supplied from the third oil passage 74 is provided, whereas the remaining configuration is similar to that in the first embodiment.

The thrust force application mechanism 200 includes an O-ring 202 that is inserted in the seal groove of the drive sprocket 52, and as a result of the oil chamber 82 that connects to the third oil passage 74 being sealed with the O-ring 202, a thrust force F toward the drive sprocket 52 is generated.

Operation

Oil that flows out from the torque converter 12 flows into the oil chamber 82 formed between the inner periphery surface of the torque converter sleeve 50 and outer periphery surface of the stator shaft 32. At this time, since the oil chamber 82 is sealed with the O-ring 202 of the thrust force application mechanism 200, oil does not leak to the space between the drive sprocket 52 and the torque converter sleeve 50. Therefore, the hydraulic pressure of the oil in the oil chamber 82 acts on the fitting portion of the drive sprocket 52, and the thrust force F pressing the drive sprocket 52 in the axial direction toward the center support 56 is generated. This thrust force F is received by a washer 204 between the center support 56 and the drive sprocket 52, and accordingly positioning of the drive sprocket 52 in the axial direction is performed at the same time.

Actions/Effects

The present embodiment particularly achieves the following actions and effects.

As described above, a thrust force F is applied toward the drive sprocket 52 due to the hydraulic pressure supplied from the third oil passage 74, so that the O-ring groove on the drive sprocket 52 can be provided on the outer diameter side rather than the inner diameter side, which facilitates groove machining and thus enables cost reduction, and also enables positioning of the drive sprocket 52.

Note that the present invention is not limited to the foregoing embodiments.

Figure 5:
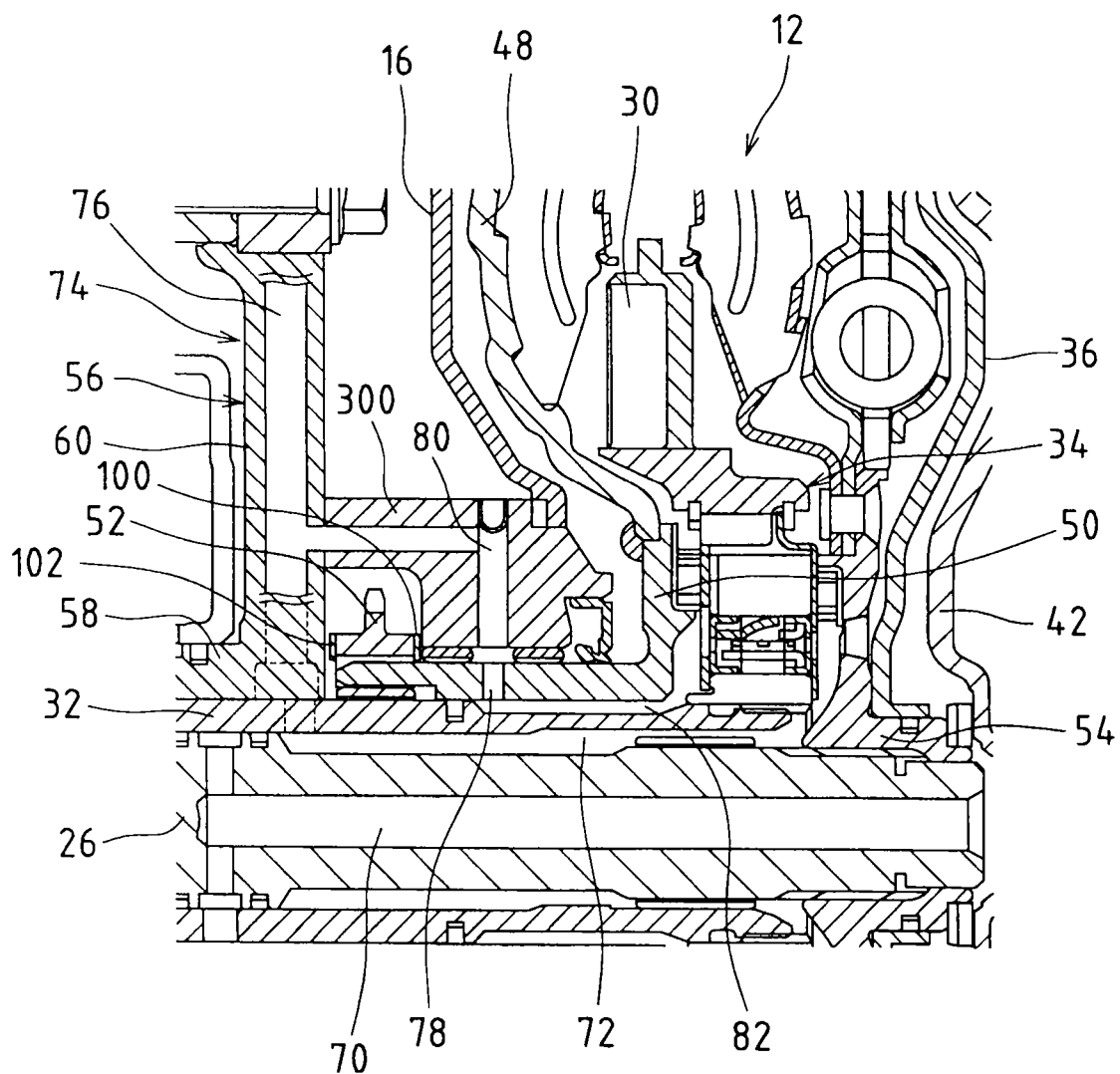
FIG. 5 is a cross-sectional and enlarged view of a torque converter of an automatic transmission device for automobile to which an oil passage structure according to a first variation is applied, and main portions in the proximity of an oil pump drive mechanism.

For example, in the first and second embodiments, a configuration is described as an example in which with respect to the third oil passage 74, oil is transferred from the center port 56 to the torque converter housing 16, and then is supplied to the torque converter 12. However, the present invention is not limited to such a configuration. As shown in FIG. 5, a configuration may be adopted in which a ring-shaped intermediary member 300 is interposed between the torque converter sleeve 50 and the torque converter housing 16, and the communication flow channel 80 is provided in the intermediary member 300, and the third oil passage 74 may be configured such that oil is transferred from the center port 56 to the intermediary member 300, and then is supplied to torque converter 12.

Figure 6:
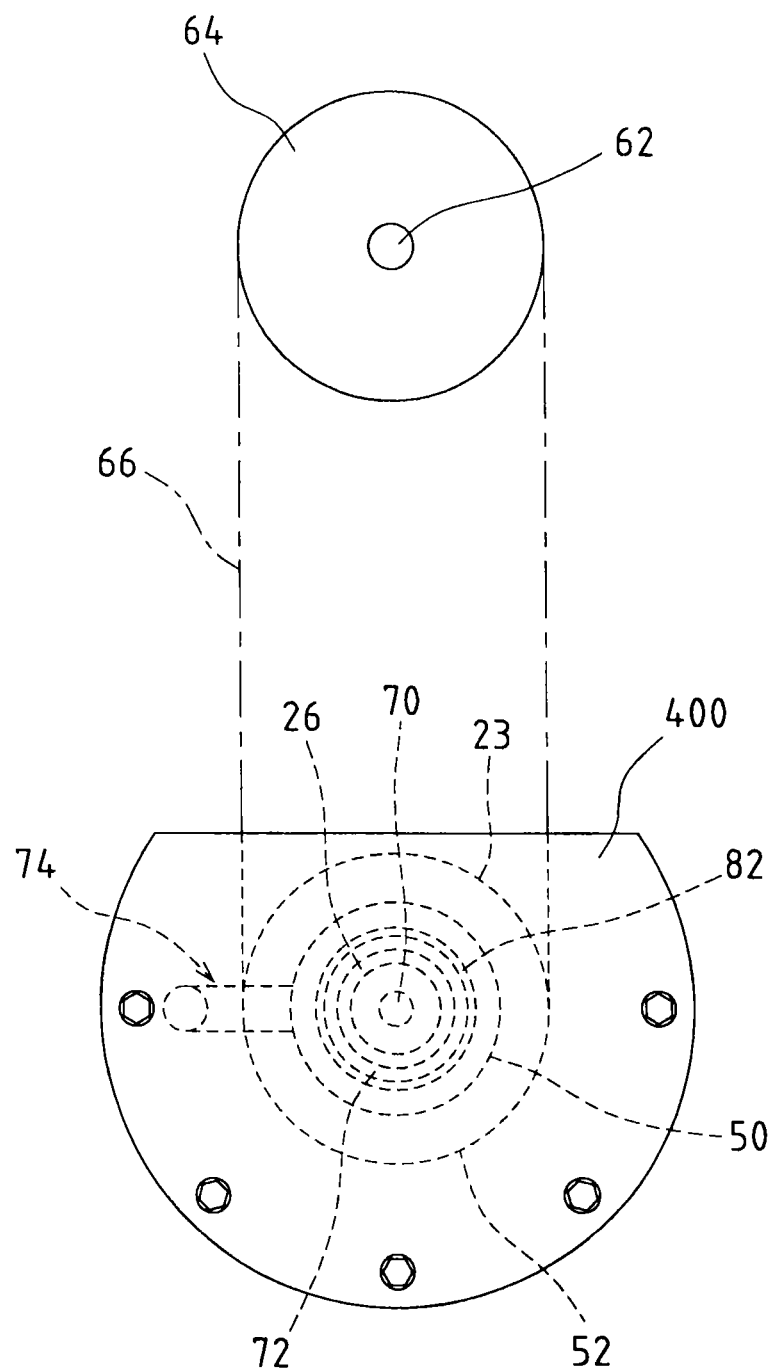
FIG. 6 is a partial enlarged view showing the structure of a second variation in a simplified manner.

Also, in the first and second embodiments, a configuration is described as an example in which the third oil passage 74 is provided on the outer periphery side of the drive sprocket 52 and inside the operation range of the chain 66. However, the present invention is not limited to such a configuration. As shown in FIG. 6, the third oil passage 74 may be provided on the outer periphery side of the drive sprocket 52, outside the operation range of the chain 66. In this case, a semicircular cover 400 that covers the drive sprocket 52 is provided. In short, it is sufficient that the third oil passage 74 is provided in a position on the outer periphery side of the drive sprocket 52 where it does not interfere with the operation of the chain 66.

Furthermore, in the second embodiment, a configuration is described as an example in which thrust force F caused by the hydraulic pressure of the third oil passage 74 is received by the washer 204 provided between the center support 56 and the drive sprocket 52. However, the present invention is not limited to such a configuration. It is also possible to provide a bearing between the center support 56 and the drive sprocket 52, so that the bearing receives the thrust force F.

It is of course possible to make various types of change in design and modifications within the scope of claims of the present specification.

INDUSTRIAL APPLICABILITY

The present invention enables utilizing the flex lock-up to a maximum extent and reducing the diameter of the sprocket, and therefore is useful for the oil passage structure of chain-driven oil pump applied to automatic transmission devices for automobile.

REFERENCE SIGNS LIST

12 Torque converter
16 Torque converter housing
30 Stator
32 Stator shaft
34 One-way clutch
52 Drive sprocket
56 Center support
64 Driven sprocket
66 Chain
70 First oil passage
72 Second oil passage
74 Third oil passage
200 Thrust force application mechanism

The invention claimed is:

1. An automatic transmission device for an automobile, said device comprising:
 a torque converter accommodated in a torque converter housing;
 a stator shaft supporting a stator of the torque converter;
 a torque converter sleeve provided concentrically with the stator shaft and coupled with an inner periphery side of an impeller shell of the torque converter;
 a first bearing provided between an inner peripheral surface of the torque converter sleeve and an outer peripheral surface of the stator shaft;
 a second bearing provided between an outer peripheral surface of the torque converter sleeve and an inner surface of the torque converter housing;
 an oil pump placed in a position separated outwardly in a radial direction from an input shaft of the torque converter; and
 a drive sprocket fitted to an outer periphery of the torque converter sleeve to drive the oil pump, wherein the first bearing is provided on an inner diameter side of a fitting portion of the torque converter sleeve, the fitting portion being fitted to the drive sprocket.

2. The automatic transmission device for an automobile according to claim 1, wherein a sealing member to seal a space between the stator shaft and the torque converter sleeve is attached to the stator shaft.

3. The automatic transmission device for an automobile according to claim 1, wherein a sealing member to seal a space between the stator shaft and the torque converter sleeve is attached to the stator shaft.

4. The automatic transmission device for an automobile according to claim 1, further comprising a sealing member interposed between the inner peripheral surface of the torque converter sleeve and an outer peripheral surface of the first bearing, the sealing member sealing an oil chamber formed between the inner peripheral surface of the torque converter sleeve and the outer peripheral surface of the stator shaft.

5. The automatic transmission device for an automobile according to claim 4, wherein the sealing member sealing the oil chamber causes hydraulic pressure supplied from the oil chamber to act on the fitting portion of the torque converter sleeve to generate a thrust force that presses the drive sprocket in an axis direction thereof, said device further comprising a washer provided on an axial end face of the drive sprocket.

* * * * *